(12) United States Patent  (10) Patent No.: US 7,439,466 B2
Yamaue et al.  (45) Date of Patent: Oct. 21, 2008

(54) TOUCH PANEL

(75) Inventors: Nobuhiro Yamaue, Fukui (JP); Shigeyuki Fujii, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/785,358

(22) Filed: Apr. 17, 2007

(65) Prior Publication Data

US 2007/0267285 A1  Nov. 22, 2007

(30) Foreign Application Priority Data

May 16, 2006 (JP) ............................. 2006-136057

(51) Int. Cl.
*G06F 3/041* (2006.01)
(52) U.S. Cl. ...................... 200/512; 345/173
(58) Field of Classification Search ........................ None
See application file for complete search history.

(56) References Cited

U.S. PATENT DOCUMENTS

2004/0051699 A1  3/2004  Tanabe et al.
2007/0132736 A1*  6/2007  Crispin ........................ 345/173
2007/0182720 A1*  8/2007  Fujii et al. ................... 345/173

FOREIGN PATENT DOCUMENTS

JP  2003-58319  2/2003

* cited by examiner

*Primary Examiner*—Renee S Luebke
(74) *Attorney, Agent, or Firm*—Wenderoth, Lind & Ponack, L.L.P.

(57) ABSTRACT

A touch panel includes a first substrate, a second substrate, and a plurality of insulating grooves. The first substrate has a first conductive layer, and a plurality of first electrodes that extend from both ends of the first conductive layer and that have first electrode lead sections. The second substrate has a second conductive layer, and a plurality of second electrodes that extend form both ends of the second conductive layer and that have second electrode lead sections. The insulating grooves are provided in at least one of the first conductive layer and the second conductive layer between any one of the first electrode lead sections and the second electrode lead sections. This structure provides a touch panel having a smaller pitch between the first electrode lead sections or between the second electrode lead sections and having stable electrical insulation and connection.

3 Claims, 5 Drawing Sheets

TOUCH PANEL

BACKGROUND OF THE INVENTION

1. Field of the Invention

The present invention relates to a touch panel used for an operation of various electronic devices.

2. Background Art

In recent years, various electronic devices such as a mobile phone and a car navigation system include very sophisticated and diversified functions and have began to increasingly incorporate therein an optically-transparent touch panel attached to a front face of a display element (e.g., liquid crystal). A user of such an electronic device depresses and operates the touch panel by a finger or a pen while visually recognizing, through the touch panel, the display on the display element at the back face of the touch panel. Through this operation, the respective functions of the electronic device are switched. Thus, a touch panel having a superior visibility and providing secure operation and an electric connection is required.

A conventional touch panel will be described with reference to FIG. 7 to FIG. 9.

FIG. 7 is a plane sectional view illustrating a conventional touch panel. FIG. 8 is a front sectional view taken along a line 8-8 of the touch panel shown in FIG. 7. In FIG. 7 and FIG. 8, upper substrate 101 has a film-like shape and is optically-transparent. Upper substrate 101 has, at a lower part thereof, optically-transparent lower substrate 102. At a lower side of upper substrate 101, optically-transparent upper conductive layer 103 is formed by material such as indium tin oxide. At an upper side of lower substrate 102, lower conductive layer 104 is similarly formed by material such as indium tin oxide.

Both ends of upper conductive layer 103 have a pair of upper electrodes (not shown). Both ends of lower conductive layer 104 have lower electrodes 105 formed in a direction orthogonal to the upper electrodes. The upper electrodes and lower electrodes 105 extend along an outer periphery of upper conductive layer 103 and lower conductive layer 104. Ends of upper substrate 101 and lower substrate 102 have a plurality of lead sections including lead sections 105a, 105b. Specifically, lead section 105a and lead section 105b are lead sections of lower electrode 105. It is noted that the upper electrode and lower electrode 105 are made of a conductive material (e.g., silver).

Slit 106 is provided at the inner side of lower electrode 105. Slit 106 is obtained by removing lower conductive layer 104 by a laser cut or an etching processing and others. A slit (not shown) is provided between the upper electrodes. The slit is similarly obtained by removing upper conductive layer 103 by a laser cut or an etching processing and others. Insulating groove 106a connected to slit 106 is provided between lead section 105a and lead section 105b, for example. The structure as described above prevents a short circuit between lead section 105a and lead section 105b.

At an upper surface of lower conductive layer 104, a plurality of dot spacers (not shown) made of insulating resin are formed with a predetermined interval therebetween. Spacer 107 having a substantially frame-like shape is provided at an outer periphery of a lower face of upper substrate 101 or an outer periphery of an upper face of lower substrate 102. An upper face and a lower face of spacer 107 are coated with adhesion layers (not shown). As a result, an outer periphery of upper substrate 101 is adhered with an outer periphery of lower substrate 102, and upper conductive layer 103 is facing to lower conductive layer 104 with a predetermined space therebetween. In this manner, touch panel 100 is provided.

Touch panel 100, thus structured, is placed on a front face of a liquid crystal display element (not shown) and others, and is attached to an electronic device. A plurality of the lead sections provided at the end section of the upper electrode and the end section of lower electrode 105, for example lead sections 105a, 105b, are connected to an electronic circuit of an electronic device (not shown), via a wiring substrate (not shown), in which an upper face and a lower face have a plurality of wiring patterns.

In the structure as described above, an upper face of upper substrate 101 is depressed and operated by a finger or a pen while the display of a liquid crystal display element provided at the back face of touch panel 100 being visually recognized. As a result, upper substrate 101 is bent and upper conductive layer 103 at the depressed portion is come into contact with lower conductive layer 104.

Then, a voltage is sequentially applied from the electronic circuit, via the wiring substrate, to the upper electrode and lower electrode 105. The applied voltage is sequentially applied to both ends of upper conductive layer 103 and both ends of lower conductive layer 104 in a direction orthogonal to upper conductive layer 103. Based on a voltage ratio of the upper electrode and a voltage ratio of lower electrode 105, the depressed position is detected by the electronic circuit. As a result, various functions of the electronic device are switched.

Since conventional touch panel 100, as described above, has been increasingly mounted in a device having a smaller size and a more sophisticated function, an interval between a plurality of lead sections connected to a wiring substrate has been required to be smaller. For example the interval between lead section 105a and lead section 105b has been required to be smaller. Specifically, a pitch therebetween has been required to be smaller. However, touch panel 100 is generally structured so that upper conductive layer 103 and lower conductive layer 104 are removed by laser cut or an etching processing to form the slits and the insulating grooves including slit 106 and insulating groove 106a. Thereafter, electrodes including the upper electrode, lower electrode 105, and lead sections 105a, 105b are formed at the outer periphery of upper conductive layer 103 and an outer periphery of lower conductive layer 104 by a printing technique or the like.

Specifically, the formation of insulating groove 106a and the formation of electrodes including the upper electrode and lower electrode 105 are generally separately performed. Thus, insulating groove 106a formed between lead sections 105a, 105b is positioned in a dislocated manner due to a tool change operation between the formation of insulating groove 106a and the formation of the electrodes or a machining apparatus positioned in a dislocated manner and others.

This causes, as shown in FIG. 9, an increased dislocation between lead sections 105a, 105b and insulating groove 106a. As a result, insulating groove 106a is dislocated to further left from lead section 105a for example, thus failing to provide insulating groove 106a in lower conductive layer 104 between left lead section 105a and right lead section 105b. Consequently, a space between lead section 105a and lead section 105b is short-circuited by lower conductive layer 104.

It is difficult to reduce a pitch between lead sections 105a, 105b in order to prevent the short-circuiting between lead section 105a and lead section 105b. Thus, a gap of about 1.2 mm is generally provided between lead section 105a and lead section 105b, and insulating groove 106a is provided in the vicinity of the center of between lead section 105a and lead section 105b. This suppresses, even when lead sections 105a, 105b or insulating groove 106a are/is provided with some dislocation, the short circuit between lead section 105a and lead section 105b to maintain insulation.

Conventional touch panel 100 as described above is disclosed, for example, in Japanese Patent Unexamined Publication No. 2003-58319.

BRIEF SUMMARY OF THE INVENTION

The present invention relates to a touch panel that provides a stable electrical insulation and connection and that can reduce a pitch among a plurality of electrode lead sections.

The touch panel of the present invention has a first optically transparent substrate, a second optically transparent substrate, and a plurality of insulating grooves. The first substrate includes: a first conductive layer; and a plurality of first electrodes extending from both ends of the first conductive layer and having first electrode lead sections. The second substrate includes: a second conductive layer; and a plurality of second electrodes extending from both ends of the second conductive layer and having second electrode lead sections. The insulating grooves are provided in at least one of the first conductive layer and the second conductive layer between any one of the first electrode lead sections and the second electrode lead sections. This structure provides a touch panel that realizes a smaller pitch between the first electrode lead sections or between the second electrode lead sections and that realizes stable electrical insulation and connection.

DETAILED DESCRIPTION OF THE INVENTION

Hereinafter, an embodiment of the present invention will be described with reference to FIG. 1 to FIG. 6.

Embodiment

Figure 1:
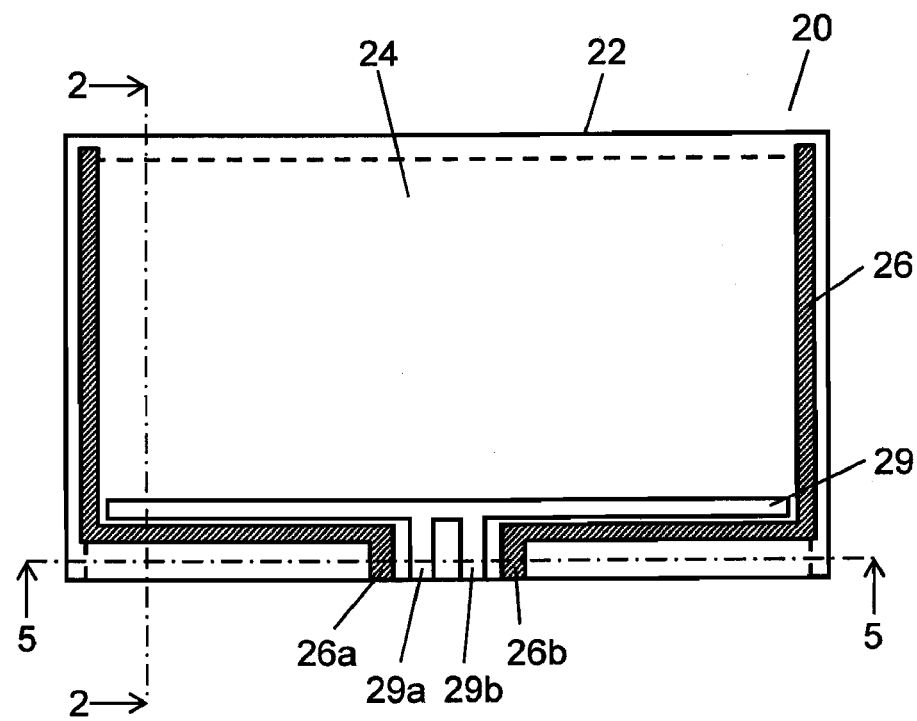
FIG. 1 is a plane sectional view illustrating a touch panel according to an embodiment of the present invention.
Figure 2:
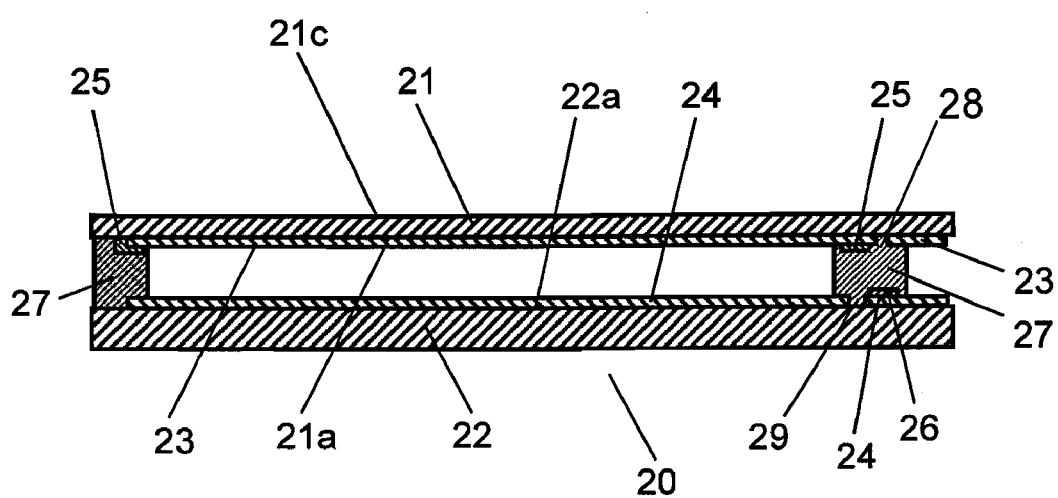
FIG. 2 is a side sectional view taken along a line 2-2 of the touch panel shown in FIG. 1 and further illustrates the first electrode 25 and the first slit 28 as shown in FIG. 3.
Figure 3:
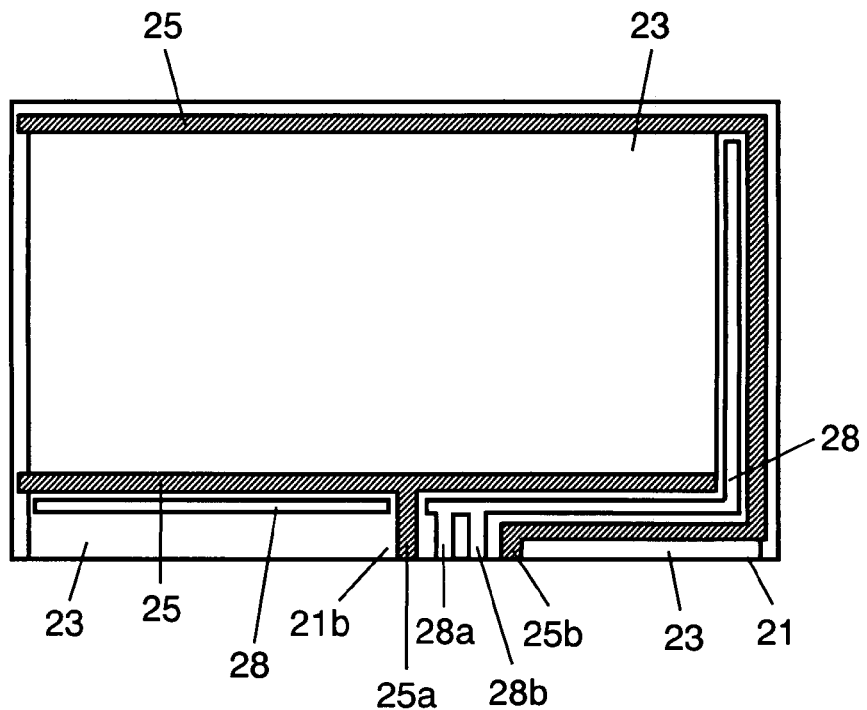
FIG. 3 is a schematic plan view illustrating an upper substrate of the touch panel shown in FIG. 1.
Figure 4:
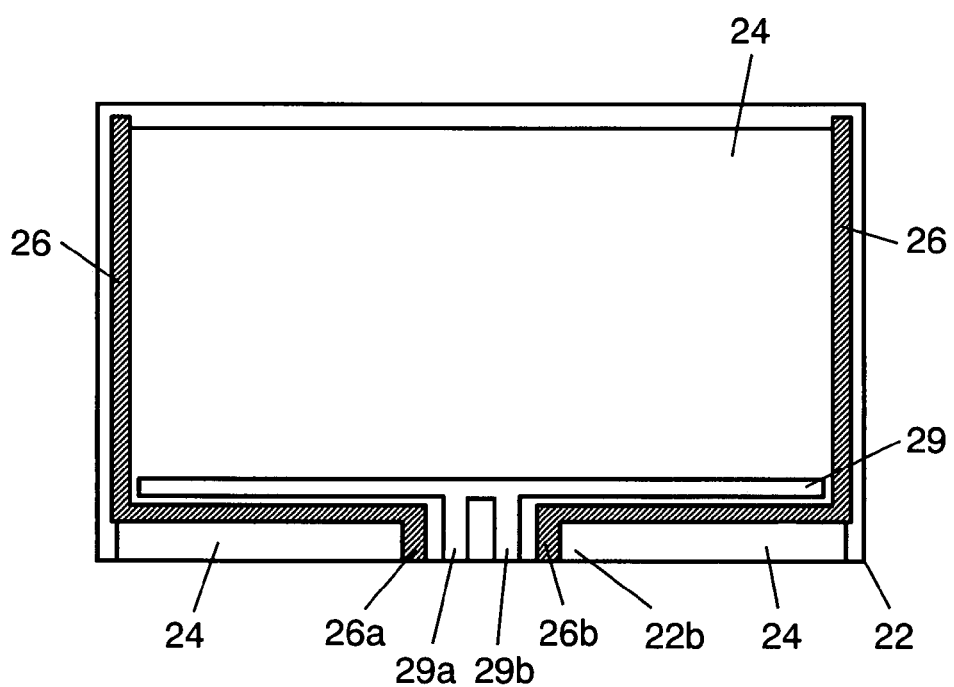
FIG. 4 is a schematic plan view illustrating a lower substrate of the touch panel shown in FIG. 1.
Figure 5:
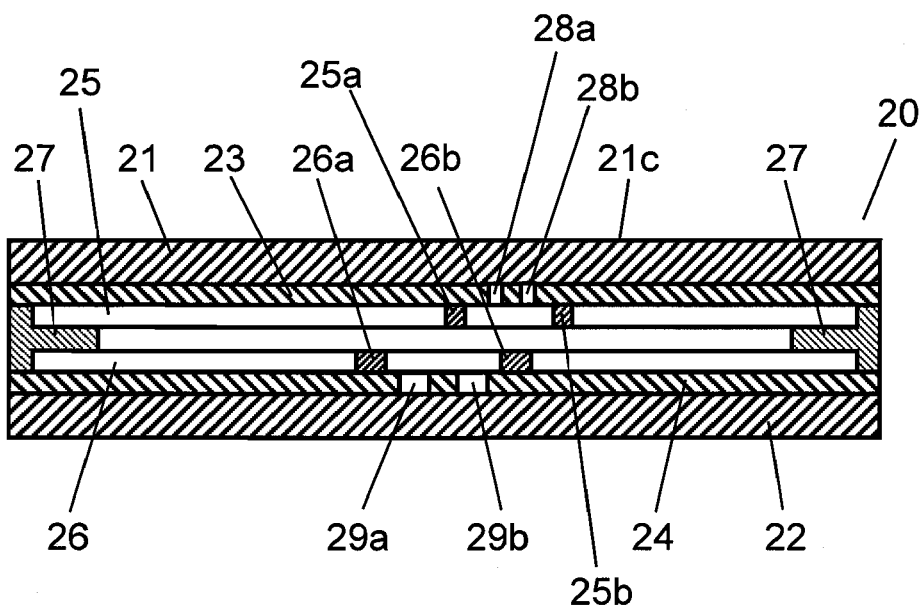
FIG. 5 is a front sectional view taken along a line 5-5 of the touch panel shown in FIG. 1.

FIG. 1 is a plane sectional view illustrating a touch panel according to an embodiment of the present invention. FIG. 2 is a side sectional view of the touch panel shown in FIG. 1 taken along the line 2-2 and further illustrates the first electrode 25 and the first slit 28 as shown in FIG. 3. FIG. 3 is a schematic plan view illustrating an upper substrate of the touch panel shown in FIG. 1. FIG. 4 is a schematic plan view illustrating a lower substrate of the touch panel shown in FIG. 1. FIG. 5 is a front sectional view illustrating the touch panel shown in FIG. 1 taken along the line 5-5.

In FIG. 1 to FIG. 5, first substrate 21 is an upper substrate that has a film-like shape, that is optically-transparent, and that is made of optically-isotropic material such as polyethylene terephthalate or polycarbonate resin. Second substrate 22 is a lower substrate that is made of optically-isotropic material such as glass, acrylic resin, or polycarbonate resin and that is optically-transparent. First face 21a, which is a lower face of first substrate 21, has thereon first conductive layer 23 as an optically-transparent upper conductive layer. Second face 22a, which is an upper face of second substrate 22, has thereon second conductive layer 24 as an optically-transparent lower conductive layer. First conductive layer 23 and second conductive layer 24 are formed by material such as indium tin oxide or tin oxide by a method such as the sputter method for example, respectively. First conductive layer 23 and second conductive layer 24 formed by the sputter method or the like are modified to have a predetermined shape by a method such as a laser cut or etching processing.

First electrodes 25, which are a pair of upper electrodes, are provided at both ends of first conductive layer 23. At both ends of second conductive layer 24 in a direction orthogonal to a direction of the both ends of first conductive layer 23 having first electrodes 25, second electrodes 26 are formed as a pair of lower electrodes. First electrode 25 extends at an outer periphery of the first conductive layer 23 and end section 21b of first substrate 21 has first electrode lead sections 25a, 25b. Similarly, second electrode 26 extends at an outer periphery of second conductive layer 24 and end section 22b of second substrate 22 has second electrode lead sections 26a, 26b. It is noted that first electrode 25 and second electrode 26 are formed by conductive material such as silver or carbon. First electrode 25 and second electrode 26 form electrodes. First electrode lead sections 25a, 25b and second electrode lead sections 26a, 26b constitute electrode lead sections.

First conductive layer 23 is removed by a laser cut or etching processing or the like to form first slit 28 and first insulating grooves 28a, 28b. First slit 28 is formed between first electrodes 25. First insulating grooves 28a, 28b are provided between first electrode lead sections 25a, 25b formed at end section 21b to have equal intervals therebetween. First insulating grooves 28a, 28b are connected to first slit 28. The existence of first insulating grooves 28a, 28b suppresses the short-circuiting between first electrode lead section 25a and first electrode lead section 25b to maintain the insulation. Similarly, second conductive layer 24 is removed by a laser cut or etching processing or the like to form second slit 29 and second insulating grooves 29a, 29b. Second insulating grooves 29a, 29b are provided between second electrode lead sections 26a, 26b formed at end section 22b to have equal intervals therebetween. Second insulating grooves 29a, 29b are connected to second slit 29. The existence of second insulating grooves 29a, 29b suppresses the short-circuiting between second electrode lead section 26a and second electrode lead section 26b to maintain the insulation. First slit 28 and second slit 29 form slits and first insulating grooves 28a, 28b and second insulating grooves 29a, 29b form insulating grooves.

Second conductive layer 24 has thereon a plurality of dot spacers (not shown) made by insulating resin (e.g., epoxy resin, silicone resin) with a predetermined interval thereamong.

Spacer 27 having a substantially frame-like shape is provided at an outer periphery at first face 21a of first substrate 21 or at an outer periphery at second face 22a of second substrate 22. Spacer 27 made by material such as polyester resin or epoxy resin is formed by a method such as printing. Adhesion layer (not shown, e.g., acrylic resin, rubber) coated on either both sides or one side of the upper face and the lower face of spacer 27 adheres the outer periphery of first substrate 21 with the outer periphery of second substrate 22. In this manner, first conductive layer 23 is facing to second conductive layer 24 with a predetermined gap therebetween. Touch panel 20 is structured in the manner as described above. It is noted that the term "frame-like" herein means a frame-like shape including only the outer frame of a polygonal shape (e.g., quadrilateral shape).

As described above, first conductive layer 23 and second conductive layer 24 are formed by the sputter method or the like. Then, the method (e.g., laser cut, etching processing) is used to remove first conductive layer 23 and second conductive layer 24 to form first slit 28, second slit 29, first insulating grooves 28a, 28b, and second insulating grooves 29a, 29b. Then, a method such as printing is used to form first electrode 25, second electrode 26, first electrode lead sections 25a, 25b, and second electrode lead sections 26a, 26b.

Specifically, formation of insulating grooves including first insulating grooves 28a, 28b and formation of electrodes including first electrode lead sections 25a, 25b are performed by separate steps. Such a separate formation may cause an attachment error of tools in the separate steps or the displacement of a machining apparatus and others to cause displacement between first electrode lead sections 25a, 25b and first insulating grooves 28a, 28b. Similarly, such a separate formation may also cause displacement between second electrode lead sections 26a, 26b and second insulating grooves 29a, 29b. However, the existence of a plurality of first insulating grooves 28a, 28b prevents the short-circuiting between first electrode lead section 25a and first electrode lead section 25b, even when some displacement is caused between first insulating grooves 28a, 28b and first electrode lead sections 25a, 25b. Similarly, the existence of a plurality of second insulating grooves 29a, 29b prevents the short-circuiting between second electrode lead section 26a and second electrode lead section 26b, even when some displacement is caused between second insulating grooves 29a, 29b and second electrode lead sections 26a, 26b.

Figure 6:
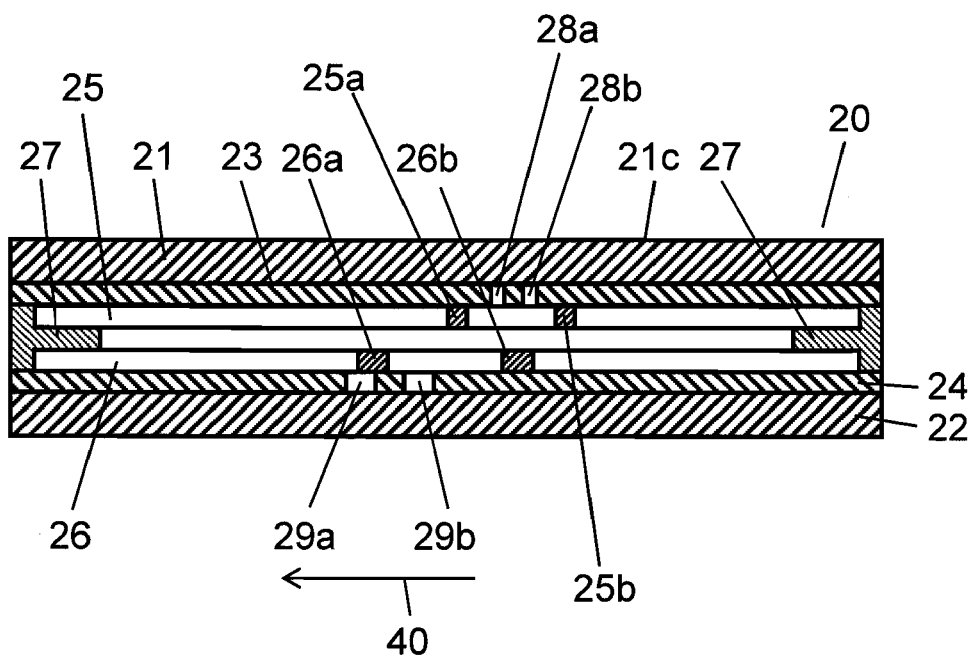
FIG. 6 is a front sectional view illustrating a touch panel according to another embodiment of the present invention.
Figure 7:
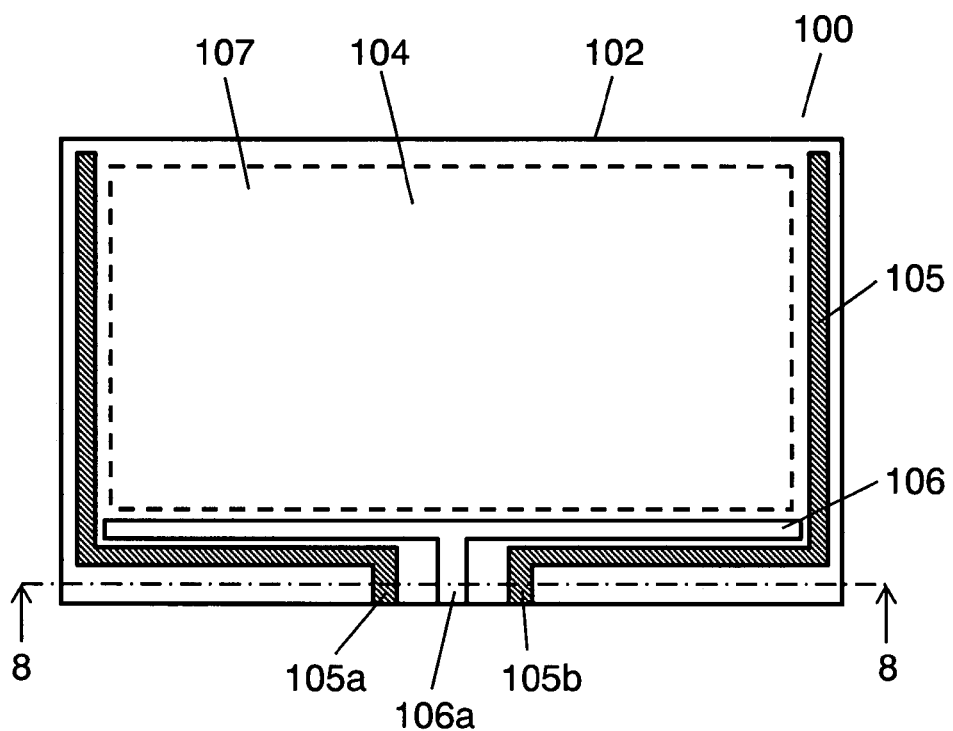
FIG. 7 is a plane sectional view illustrating a conventional touch panel.
Figure 8:
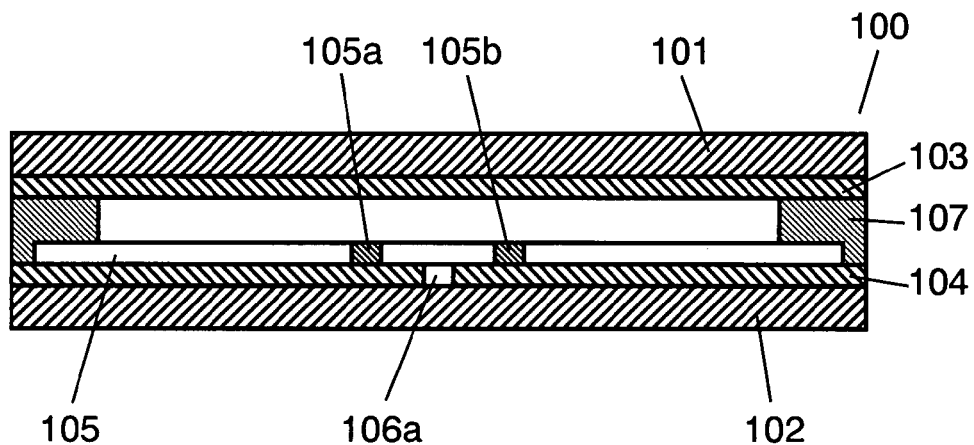
FIG. 8 is a front sectional view taken along a line 8-8 of the touch panel shown in FIG. 7.
Figure 9:
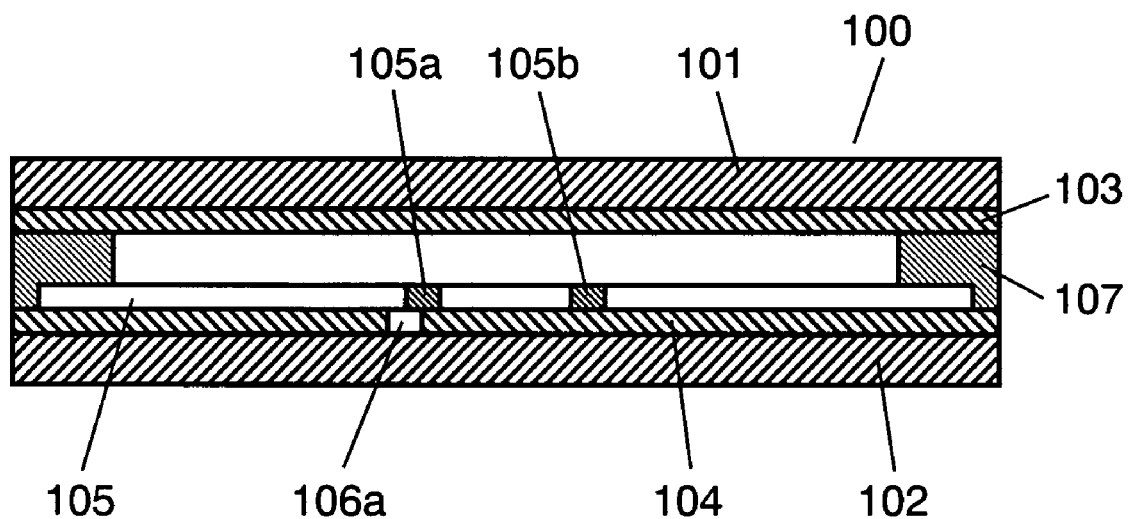
FIG. 9 is a front sectional view illustrating another embodiment of a conventional touch panel.

For example, it is assumed that a laser cut processing forms two second insulating grooves 29a, 29b having a width of about 100 μm between second electrode lead section 26a and second electrode lead section 26b, so that second insulating grooves 29a, 29b have an interval of 0.3 mm therebetween. In this case, as shown in FIG. 6, even when a displacement of 0.3 mm or more of second insulating grooves 29a, 29b is caused in a direction shown by arrow 40, second insulating groove 29b maintains the insulation between second electrode lead section 26a and second electrode lead section 26b.

Specifically, so long as second insulating grooves 29a, 29b are prevented from being extremely displaced by 0.6 mm or more in the direction of arrow 40 or an opposite direction of the direction of arrow 40, any of second insulating groove 29a and second insulating groove 29b is formed between second electrode lead section 26a and second electrode lead section 26b. This prevents the short-circuiting between second electrode lead section 26a and second electrode lead section 26b, thereby providing stable electrical insulation. Consequently, touch panel 20 can operate in a stable manner.

Alternatively, second insulating grooves 29a, 29b also may be arranged between second electrode lead section 26a and second electrode lead section 26b with equal intervals of 0.3 mm, for example as described above. Specifically, second electrode lead section 26a, second insulating groove 29a, second insulating groove 29b and second electrode lead section 26b also may be arranged with an equal interval of 0.3 mm, respectively. This prevents, even when second insulating grooves 29a, 29b are displaced by approximately 0.6 mm, the short-circuiting between second electrode lead section 26a and second electrode lead section 26b. Even in such a case, an interval between second electrode lead section 26a and second electrode lead section 26b is 0.9 mm, which decreases the interval therebetween. Thus, the so-called smaller pitch can be realized between second electrode lead section 26a and second electrode lead section 26b.

Similarly, stable electrical insulation and a smaller pitch also can be easily realized between first electrode lead section 25a and first electrode lead section 25b.

Touch panel 20, thus structured, is placed on a front face of a liquid crystal display element (not shown) or the like and is attached to an electronic device (not shown). Then, first electrode lead sections 25a, 25b and second electrode lead sections 26a, 26b are connected to an electronic circuit (not shown) of the electronic device, for example, via a wiring substrate (not shown) or the like having a plurality of wiring patterns in an upper face and a lower face.

Through the structure as described above, a user of the electronic device depresses and operates upper face 21c of first substrate 21 by a finger or a pen for example while visually recognizing the display by the liquid crystal display element provided at a back face of touch panel 20. As a result, first substrate 21 is bent to cause first conductive layer 23 at the depressed portion to come into contact with second conductive layer 24.

Then, a voltage is sequentially applied from the electronic circuit via the wiring substrate to first electrode 25 and second electrode 26, respectively. The voltages applied to first electrode 25 and second electrode 26 are sequentially applied to the both ends of first conductive layer 23 and the both ends of second conductive layer 24 in a direction orthogonal to the both ends of first conductive layer 23, respectively. Then, based on the voltage ratio of first electrode 25 and the voltage ratio of second electrode 26, the depressed position is detected by the electronic circuit. As a result, various functions of the electronic device are switched.

As described above, according to this embodiment, first conductive layer 23 between first electrode lead sections 25a, 25b includes first insulating grooves 28a, 28b. This allows, even when some displacement between first electrode lead sections 25a, 25b and first insulating grooves 28a, 28b is caused, any one of a plurality of first insulating grooves 28a, 28b to maintain the insulation between first electrode lead section 25a and first electrode lead section 25b. Similarly, second conductive layer 24 between second electrode lead sections 26a, 26b includes second insulating grooves 29a, 29b. This allows, even when some displacement is caused between second electrode lead sections 26a, 26b and second insulating grooves 29a, 29b, any one of a plurality of second insulating grooves 29a, 29b to maintain insulation between second electrode lead section 26a and second electrode lead section 26b. This provides a touch panel 20 that realizes a stable electrical insulation and secure operation or electrical connection and separation.

Furthermore, first insulating grooves 28a, 28b arranged between first electrode lead sections 25a, 25b with equal intervals prevent short-circuiting between first electrode lead section 25a and first electrode lead section 25b and also easily provide a smaller pitch between first electrode lead section 25a and first electrode lead section 25b. Similarly, second insulating grooves 29a, 29b arranged between second electrode lead sections 26a, 26b with equal intervals prevent short-circuiting between second electrode lead section 26a and second electrode lead section 26b and also easily provide a smaller pitch between second electrode lead section 26a and second electrode lead section 26b.

The above section has described a structure in which first electrode 25 extends at the outer periphery of first conductive layer 23, and end section 21b of first substrate 21 includes first electrode lead sections 25a, 25b. The above section has described a structure in which second electrode 26 extends at the outer periphery of second conductive layer 24, and end section 22b of second substrate 22 includes second electrode lead sections 26a, 26b. However, the present invention also can be applied to another structure in which any one of first electrode 25 or second electrode 26 is introduced via a through hole (e.g., silver, copper) and any one of end section 21b of first substrate 21 or end section 22b of second substrate 22 includes four electrode lead sections. The term "four electrode lead sections" means first electrode lead section 25a, first electrode lead section 25b, second electrode lead section 26a, and second electrode lead section 26b.

The above section also has described a structure in which both of first conductive layer 23 and second conductive layer 24 have a plurality of insulating grooves including first insulating grooves 28a, 28b and second insulating grooves 29a, 29b, respectively. However, the present invention is not always limited to the structure in which both of first conductive layer 23 and second conductive layer 24 have a plurality of insulating grooves. For example, another structure also may be used in which second conductive layer 24 includes second insulating grooves 29a, 29b and first conductive layer 23 does not include first insulating grooves 28a, 28b. On the contrary, still another structure also may be used in which first conductive layer 23 includes first insulating grooves 28a, 28b and second conductive layer 24 does not include second insulating grooves 29a, 29b. Specifically, the action and effect of the present invention can be achieved by providing a plurality of insulating grooves in any one of first conductive layer 23 and second conductive layer 24.

The above section also has described a structure in which the outer periphery of first substrate 21 and the outer periphery of second substrate 22 are adhered by spacer 27 and adhesion layer. However, the present invention is not always limited to the structure in which the outer periphery of first substrate 21 and the outer periphery of second substrate 22 are adhered by spacer 27 and adhesion layer. The invention also can be applied to another structure not using spacer 27 for example so long as the structure has first substrate 21 facing to second substrate 22 with a predetermined gap therebetween. Still another structure also may be used in which the outer periphery of first substrate 21 is adhered to the outer periphery of second substrate 22 by a two-sided tape having surfaces coated with adhesive agent (not shown).

What is claimed is:

1. A touch panel comprising:
   a first substrate having optical transparency and including:
     a first face;
     a first conductive layer formed on the first face; and
     a plurality of first electrodes, each of the first electrodes being formed to extend between two edges of the first conductive layer and each of the first electrodes having a first electrode lead section;
   a second substrate having optical transparency and including:
     a second face;
     a second conductive layer formed on the second face and arranged to face the first conductive layer to form a gap between the first conductive layer and the second conductive layer; and
     a plurality of second electrodes, each of the second electrodes being formed to extend between two edges of the second conductive layer and formed to extend in a direction that is orthogonal to a line connected by the two edges of the first conductive layer between which a first electrode extends and each of the second electrodes having a second electrode lead section; and
   a plurality of insulating grooves provided in at least any one of the first conductive layer and the second conductive layer and provided between at least one of (i) two first electrode lead sections and (ii) two second electrode lead sections.

2. The touch panel according to claim 1, wherein
   the insulating grooves of the first conductive layer or the second conductive layer are arranged to have an equal distance therebetween.

3. The touch panel according to claim 1, wherein the insulating grooves include:
   a plurality of first insulating grooves provided in the first conductive layer and provided between the first electrode lead sections of the plurality of first electrodes; and
   a plurality of second insulating grooves provided in the second conductive layer and provided between the second electrode lead sections of the plurality of second electrodes.

* * * * *